US009306755B2

(12) United States Patent
Borchers

(10) Patent No.: US 9,306,755 B2
(45) Date of Patent: Apr. 5, 2016

(54) DATA TRANSMISSION DEVICE

(75) Inventor: Klaus Borchers, Otterbach (DE)

(73) Assignee: MOBOTIX AG, Winnweiler (DE)

( * ) Notice: Subject to any disclaimer, the term of this patent is extended or adjusted under 35 U.S.C. 154(b) by 889 days.

(21) Appl. No.: 13/122,159

(22) PCT Filed: Sep. 30, 2009

(86) PCT No.: PCT/DE2009/001360
§ 371 (c)(1),
(2), (4) Date: Jul. 6, 2011

(87) PCT Pub. No.: WO2010/037369
PCT Pub. Date: Apr. 8, 2010

(65) Prior Publication Data
US 2011/0254366 A1     Oct. 20, 2011

(30) Foreign Application Priority Data
Oct. 2, 2008     (DE) .......................... 10 2008 049 968

(51) Int. Cl.
| H04B 3/54 | (2006.01) |
| H04L 12/10 | (2006.01) |
| H04L 12/28 | (2006.01) |
| H04L 12/40 | (2006.01) |
| H04L 12/46 | (2006.01) |

(52) U.S. Cl.
CPC ............ *H04L 12/10* (2013.01); *H04L 12/2838* (2013.01); *H04L 12/40045* (2013.01); *H04L 12/4625* (2013.01); *H04L 2012/2843* (2013.01); *H04L 2012/2845* (2013.01)

(58) Field of Classification Search
CPC ........................................................ H04B 3/54
USPC ............................................................. 307/1
See application file for complete search history.

(56) References Cited

U.S. PATENT DOCUMENTS

| 6,640,308 | B1 * | 10/2003 | Keyghobad et al. .......... 713/300 |
| 2006/0239244 | A1 | 10/2006 | Hurst et al. |
| 2007/0019560 | A1 | 1/2007 | Brewer et al. |
| 2007/0236853 | A1 * | 10/2007 | Crawley ........................ 361/119 |
| 2008/0168283 | A1 * | 7/2008 | Penning ........................ 713/310 |

FOREIGN PATENT DOCUMENTS

| DE | 20 2005 021 500 | 7/2008 |
| EP | 1 942 600 | 7/2008 |
| WO | 2007 012014 | 1/2007 |

OTHER PUBLICATIONS

International Search Report issued Jan. 22, 2010 in PCT/DE09/01360 filed Sep. 30, 2009.

* cited by examiner

*Primary Examiner* — Rexford Barnie
*Assistant Examiner* — Daniel Kessie
(74) *Attorney, Agent, or Firm* — Oblon, McClelland, Maier & Neustadt, L.L.P.

(57) ABSTRACT

The invention relates to a data transmission device for transmitting data between an Ethernet connection (3) suitable for energy transmission and a lighting mains current-free two-wire connection (4). According to the invention, a means for energy transmission is disposed between the Ethernet connection (3) and the lighting mains current-free two-wire connection (4).

13 Claims, 1 Drawing Sheet

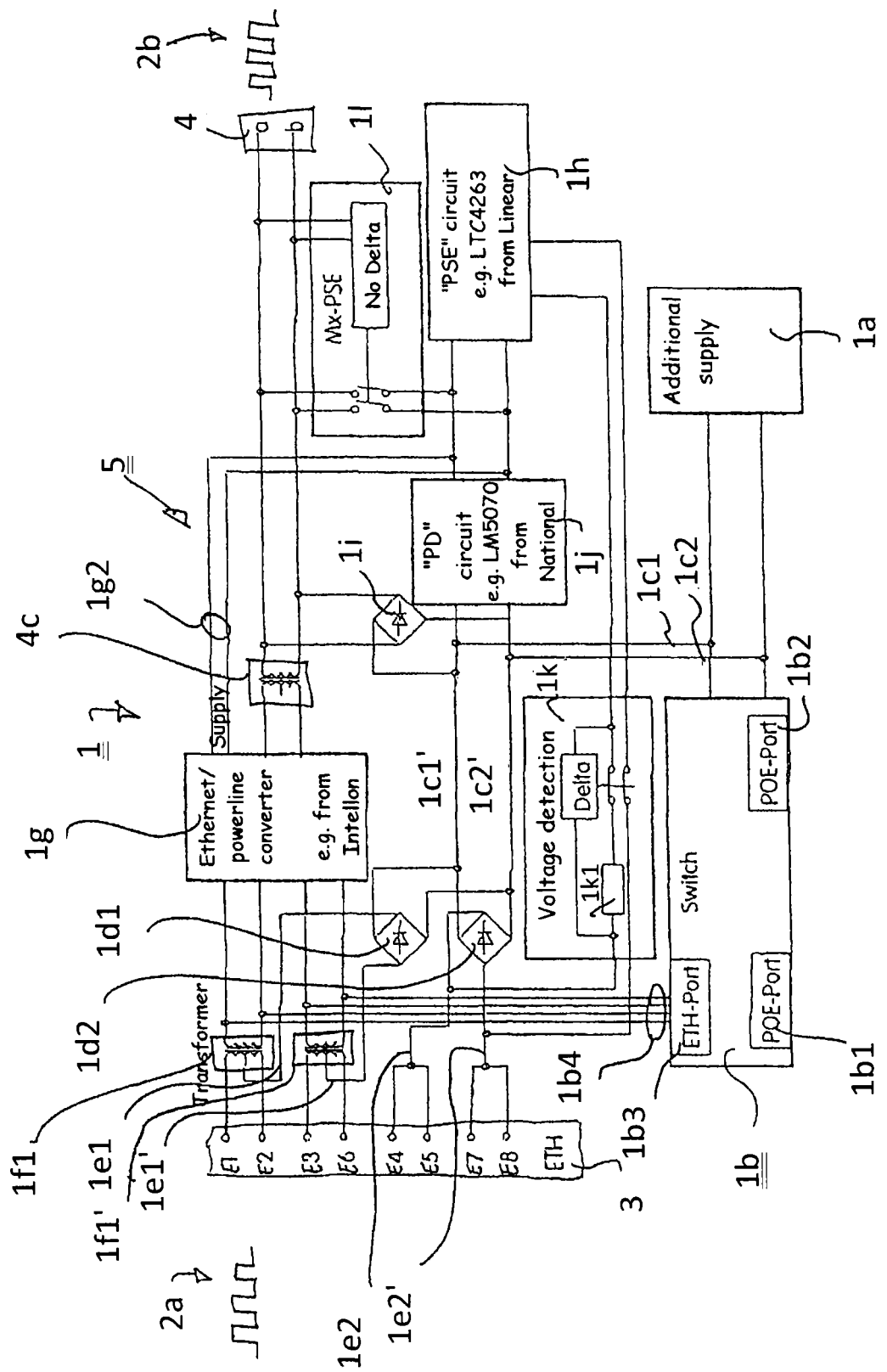

DATA TRANSMISSION DEVICE

The present invention refers to what is mentioned in the preamble of the claim, and therefore relates to data transmission and to devices for this purpose.

In engineering, data is transmitted via a multiplicity of different line arrangements using different protocols. One widely used means of communication in this case is the so-called Ethernet. Ethernet lines typically have a plurality of electrical conductors, which are jointly shielded. This allows high transmission rates to be achieved. However, it is often undesirable to have to lay new lines, for example when re-equipping existing old buildings. Two-wire lines such as bell wires or telephone lines are typically still present here. The use of existing lines has the advantage that the installation can be implemented more easily; however, the transmission rates are typically lower. It is also already known for conventional power cables to be used for data transmission, instead of existing bell wires or telephone lines. This is known as "powerline data transmission". In this known method, data and 230 V mains power are transmitted simultaneously via the mains line. However, the known powerline technique often cannot be used for relatively major installations in old buildings. In this case, because of a large number of connecting lines, junctions, fuse boxes, etc., the power cables are generally not well suited to data transmission by means of the powerline technique.

Power and data can also be transmitted simultaneously via the Ethernet, and a dedicated Standard (802.3af) has even been issued for this purpose, in order to also supply network terminals with power via the Ethernet. However, this in turn results in the need to provide appropriate lines everywhere.

It is desirable to provide a capability to transmit data between different devices in such a way that there is no need for complex installations.

The object of the present invention is to provide something new for industrial use.

This object is achieved as claimed in independent form. Preferred embodiments are specified in the dependent claims.

A first fundamental idea of the present invention therefore proposes a data transmission device for transmission of data between an Ethernet connection, which is suitable for power transmission, and a connection for a two-wire line which does not carry any current from the mains, with a means being provided for power transmission between an Ethernet connection and a two-wire connection which carries no mains current.

A first basic idea of the invention therefore comprises the discovery that the installation on existing systems can be considerably simplified if power transmission is enabled, together with data transmission, via two-wire connections which carry no mains current. By way of example, this allows an internal area camera to be used for monitoring at points in the building where a bell or a telephone was previously arranged, without having to supply the camera separately via power cables, which are typically undesirable. This results not only in a visually better appearance, but also reduces the overall installation costs. In this case, explicitly, the two-wire connection carries no mains current, that is to say these are not 230 V mains lines in a building or the like. In one particularly preferred variant, the two-wire line not only does not carry a voltage of 230 V, but also does not carry any other externally fed voltages, such as 12 V bell voltages; it is obvious that this freedom from voltage relates to the state before power is fed into the two-wire line from the arrangement according to the invention; it should also be mentioned that, although the following text refers throughout to not carrying mains current, this normally, however, also discloses freedom from other externally fed voltages, without this being mentioned separately on each occasion.

In one particularly preferred variant, power is transmitted from the two-wire line to the Ethernet connection, to be precise preferably such that a power supply in accordance with the power-over-Ethernet-Standard is created at the Ethernet connection. This makes it possible to connect terminals without their own power supply to an end point of a two-wire line by means of the data transmission device, without any additional wiring. Terminals such as these may be microphones, cameras or alarm transmitters and the like, although these end users are mentioned only by way of example, and the invention is not intended to be restricted to these loads, which are mentioned only as being preferred.

It is furthermore possible to design the data transmission device such that power is transmitted from an Ethernet connection toward the two-wire line, that is to say, by way of example, power is taken from the Ethernet and fed into the two-wire line in accordance with the power-over-Ethernet-Standard. This makes it possible to either connect terminals directly to the two-wire line or else, in combination with a data transmission device which allows power transmission in the opposite direction, to use a two-wire line in order to allow both power and data to be transmitted without additional installation complexity. By way of example, it is then possible in each case to provide only data transmission devices according to the invention at the end points of a two-wire line, in order to allow Ethernet-compatible devices to be connected to both ends. For example, a camera or a camera cluster can thus be connected via a two-wire line to a central server, and no separate power supplies are required for the camera itself.

In arrangements such as this, it is advantageous for the data transmission device itself to operate bidirectionally, that is to say to be able to transmit power optionally either from the two-wire line to the Ethernet connection or, instead of this, to be able to receive power from the Ethernet connection and feed it into the two-wire line. A process such as this makes it possible to form a complete connection using one and the same type of data transmission devices, not only using Ethernet lines but also where Ethernet lines are not available, without separate power supplies having to be provided in intermediate areas or at end points. This allows a complete system to be installed easily and, in particular, less conspicuously.

The data transmission device will typically have a scanning means or the like which can be used to detect whether a power load is connected to a specific connection. By way of example, this can be done by detecting whether there is a voltage difference on a line pair of a connection, or whether such a voltage difference can be produced. If there is a potential difference between two lines of a pair, without a voltage having been fed to the line at the data transmission device end, then power can be received from the line; if, in contrast, no such input voltage is present, no power feed is envisaged, at least at the opposite end of the line pair. A—possibly small—test voltage can then be fed to the line pair, and/or a test voltage which collapses even at very low current levels, that is to say a test voltage from a voltage source having a very high internal resistance.

If this test voltage can be detected across the line pair, the line pair is terminated at the end by, at most, a high impedance. In contrast, if the voltage collapses, then current can flow at the opposite end of the line pair, which means that there is a low terminating impedance there, which is in turn typically the situation when a load is connected there. By measuring a voltage on the line pair, it is therefore possible to deduce whether a load is connected to the opposite connection end of the line pair. It should be noted that any terminating impedance which may be required according to the standard, in order to prevent signal wave reflections, can be considered to be irrelevant for this measurement (which may also be in the form of an impedance measurement). Therefore, if a line pair requires a terminating impedance at the opposite end, then the connection of a load is typically detected only if the detected terminating impedance is significantly lower.

The fact that, apart from this, other types of detection of the connection of a power load are possible is mentioned only as an extreme precaution, for disclosure reasons.

It is particularly preferable for the data transmission device to provide not only a power supply for loads which are connected to one of the data connections and are thus connected via a line, but to have a separate output, which is independent of data transmission and via which low-power loads such as light-emitting diodes or the like can be supplied. This can provide emergency lighting which, in particular with an appropriate configuration of the data transmission device, would also be remotely switchable or else is connected for short periods for maintenance and installation purposes. Other loads can likewise possibly be connected.

The two-wire line which carries no mains current will, in typical examples, be a bell line and/or telephone line, and the corresponding two-wire connection of the data transmission device will accordingly be designed for connection of a line such as this. This relates both to the mechanical design of the data transmission device in which, for example, terminal options can be provided for individual wires and, alternatively and/or additionally, to the data-transmission design. In particular, in preferred cases, the data rate intended for transmission via the two-wire line will be less than that data rate which can be achieved via the Ethernet connection. It is preferable to provide more than just two connections on the data transmission devices. In particular, it is possible to arrange more than one Ethernet connection on the data transmission device. When a plurality of Ethernet connections are provided in the data transmission device, it is not absolutely essential for all such Ethernet connections to be in the form of power-over-Ethernet ports; however, this is possible and preferred. The provision of a plurality of Ethernet ports on the data transmission device makes it possible to dispense with a switch, hub or router provided that the appropriate functionality is provided in the data transmission device itself. In this case, the power supply for a switch, hub or router such as this (referred to just as switches in the following text, for linguistic simplicity reasons) can be provided via a remote supply voltage feed, in which case, as stated above, the supply voltage can be selectively provided at an input on the two-wire side or on the Ethernet side. It should also be noted that multifunctionality can be provided, if required, such that, when a plurality of two-wire connections and/or a plurality of Ethernet connections are provided and power can be received from more than one connection, different connections can be fed from different sources.

When there are a plurality of Ethernet connections on the data transmission device, it is particularly preferable to be able to transmit data between individual Ethernet connections more quickly than via the two-wire line. By way of example, this makes it possible for a printer to be addressed locally very quickly by a PC, while a two-wire line which leads to a camera is operated at a low data transmission rate, which is nevertheless sufficient, in particular because of data compression in the camera.

The invention will be described in the following text with reference to FIG. 1, in which:

FIG. 1 shows a data transmission device according to the present invention.

As shown in FIG. 1, a data transmission device 1, which is annotated 1 in general, for transmission of data 2$a$, 2$b$ between an Ethernet connection 3, which is suitable for power transmission, and a two-wire connection 4 which carries no mains current, has a means 5 for transmitting power between the Ethernet connection 3 and the two-wire connection 4 which carries no mains current.

In the illustrated exemplary embodiment, the data transmission device is an autonomous data transmission device 1 which is not provided with a separate power supply unit and also has a connection 1$a$ for an additional supply for loads with which no data need be interchanged, as well as a switching element 1$b$, which has a plurality of power-over-Ethernet ports 1$b$1, 1$b$2 and can internally be connected to the Ethernet connection 3 which is suitable for power transmission. In this case, the switch 1$b$ is illustrated as an integral part of the data transmission device according to the invention and can communicate at full speed, for example at 1 MB/s or more, between the Ethernet connections 1$b$1 and 1$b$2, which are illustrated as POE ports here, and the Ethernet port 3. Power is supplied to the switch via the power fed into the Ethernet port, as will be described further in the following text.

It should be mentioned that a switch 1$b$ such as this, which has at least one power-over-Ethernet port and at least two further Ethernet ports, is advantageous not only in conjunction with the data transmission device according to the invention, but offers advantages in its own right, and is also considered inventive in its own right; we reserve the right to submit divisional applications relating to this. The required internal circuitry in an independent switch, hub or router such as this for supplying power to the circuits which provide the switching functionality will become directly evident from the following text.

In the illustrated example, this is done via lines 1$c$1, 1$c$1, which once again receive power in the form of DC voltage power from polarity-reversal protection circuits 1$d$1, 1$d$2 from lines 1$c$1', 1$c$2', with the polarity-reversal protection circuits themselves receiving power from the Ethernet port 3. The lines 1$e$1 and 1$e$1' are in this case connected to respective center taps on a data transformer 1$f$1 or 1$f$1', with the data transformer 1$f$1 receiving signals via the connections E1, E2 of the Ethernet port 3, and the transformer 1$f$1' sending signals via the line pairs E3 and E6 of the Ethernet port 3. In contrast, the lines 1$e$2 and 1$e$2', respectively, lead to line pairs E4, E5 and E7, E8, respectively, of the Ethernet port 3, and can likewise receive power.

The lines E1, E2, E3, E6 form a four-wire line set for Ethernet transmission of the data 2$a$. The transformers 1$f$1 and 1$f$1' are able to transmit the data 2$a$ at a sufficiently high frequency. The respective transformers 1$f$1 and 1$f$1' are connected on the output side on the one hand to the Ethernet port 1$b$3 of the switch 1$b$, cf. the line harness 1$b$4, and to an Ethernet powerline converter 1$g$, which is conventional in its own right, for example as it is obtainable from INTELLON. The Ethernet powerline converter is supplied via a supply line 1$g$2, with the circle shown around the supply line indicating that the supply line may have more than one wire, in order to pass a plurality of voltages and/or different potentials to the Ethernet powerline converter 1$g$.

The Ethernet transmission device 1 now furthermore has a power sourcing equipment circuit 1$h$ in accordance with Standard 802.3af-POE. This circuit 1$h$ is conventional in its own right and can be obtained, for example, as the module LTC4263 from Linear Technology.

A polarity-reversal protection arrangement is also provided on the two-wire side, after the connection 4, cf. 1i. The signals received at the connections a and b of the two-wire connection 4 are also passed via a transformer 4c and to an appropriate interface for the Ethernet/powerline converter 1g, which otherwise likewise receives the signals downstream from the transformers 1f1 and 1f1, in order to provide a data interchange between the lines E1, E2, E3, E6 on the one hand and 4a, 4b on the other hand, thus allowing data packets 2a and 2b in each case to be transmitted to the other side.

The output side of the diode circuit 1i leads to the respective lines 1c1' and 1c2' to which signals are applied from the diode circuits 1d2 and 1d1. These lines 1c1' and 1c2' are in turn connected on the input side to a power detection circuit for the power-over-Ethernet Standard, cf. reference number 1j. This module may be a standard module, for example the LM5070 module from National Technology. This module is designed to offer a defined impedance value in a negotiation phase between the lines 1c1' and 1c2' if it is to be determined by voltage supply whether a voltage signal can be applied to a line. In other words, while complying with the relevant protocols, for example at the opposite end which is connected to the Ethernet port 3, a determination is made as to whether the data transmission device 1 is ready for the acceptance of power. This will be the case when a low test voltage produces a corresponding, low test current via the line. This will not be the case when voltage is already applied via the line 4a, 4b. This makes it possible to prevent voltage sources, particularly in the case of polarity reversal, which are provided on the one hand on the Ethernet side and on the other hand at the same time on the two-wire side, from being able to interfere with one another, or destroy one another. In addition, it is assumed that a corresponding check of readiness for the acceptance of power is also provided when power is to be fed to the data transmission device 1 via the two-wire line 4.

The data transmission device 1 furthermore has a voltage detection means 1k, which makes it possible to prevent power which is received via the Ethernet port and is detected in the circuit 1j "PD" being fed back via the power supply arrangement "PSE", in order to check for test purposes whether there is a load on the Ethernet port. This voltage detection means 1k is provided according to the invention because it would otherwise be possible for the low test voltage to be applied to a line which is already carrying a high supply voltage. A situation such as this cannot occur in the POE Standard because power can enter there only from an Ethernet switch, and feedback cannot occur. The voltage detection means therefore makes bidirectionality of the onward feeding of power safer. As is indicated only schematically, (complete) passing on of a supply voltage can be precluded completely if a corresponding voltage drop is detected across an impedance, cf. the circuit Delta, which is indicated only schematically in 1k, as well as the impedance 1k1. Here, a voltage is therefore optionally output from the power sourcing equipment circuit to the lines E4, E5, E7, E8 only if it has been found by detection of a corresponding voltage/current behavior there that a power load is connected at the opposite end. A corresponding situation is a function on the side toward the two-wire connection 4, where a corresponding arrangement 1l is provided. Although the through-switching is illustrated in the form of a relay, it will be immediately evident to a person skilled in the art that this serves only to provide a better explanation and for direct understanding of the circuit, although, in practice, transistors and the like are typically used for passing on the voltages.

For lines 4a, 4b, that is to say the connection 4, all that is done is to check whether there is already a voltage between the lines 4a, 4b. If this is not the case, a voltage can be applied. The check is carried out by a circuit means 1l. The aim is to disclose that it could be possible to carry out a test for a short circuit between the connections 4a, 4b or to determine whether a load is connected, as is known per se from the determination of the current/voltage behavior by testing, from the POE Standard.

The arrangement can now be operated in various ways.

On the one hand, the module can be supplied with power via a POE switch. This can be done via the lines 1, 2 and 3, 6 or via the lines 4, 5 and 7, 8, to be precise in each case in a corresponding manner via the appropriate polarity-reversal protection circuits. If such an externally fed in supply voltage is applied, the PD-circuit 1j will effect at the (opposite) power feed end side a successful detection of a load and will thereafter pass through the power, namely in particular in order to supply the ETH poweline converter 1g and the PSE circuit 1h as well as the circuit 1l, in order to also apply power to the two-wire lines 4a, 4b, as required. In this case, power is not fed to the two-wire line 4a, 4b without having previously used the circuit 1l to ensure that power cannot also already be received from there, that is to say from the lines 4a, 4b, or that voltage is present there.

Alternatively, instead of this, current can be supplied via the two-wire line 4a, 4b. Voltage is then applied to the circuit PD once again via the polarity-reversal protection circuit 1i, indicating that a load is connected, as a result of which the presence of a current load is detected in a negotiation phase between the data transmission device 1 and a power supply device which is provided on the opposite side of the connection 4. (The fact that, instead of this, it is also possible to easily pass on power received on the lines 4a, 4b when no power is yet received from the Ethernet connection side, to be precise to pass this on without previous negotiation taking account of the voltage/current behavior, should be mentioned. This simpler embodiment is preferred if it cannot be expected on the input side 4a, 4b that an opposite end is waiting for a negotiation in accordance with the protocol before applying power to the connections 4a, 4b but it is in fact necessary to wait for the opposite end of the connection 4 to feed in power immediately and unconditionally.) Internally, the received power can then be passed on on the one hand to the Ethernet/powerline converter and on the other hand to further loads, for example also to those which are connected to the Ethernet port 3 or to the Ethernet ports 1b1 and 1b2, or to the additional supply. It should be noted that it makes more sense to also be able to supply this when a power source is connected to the Ethernet port 3.

If, in contrast, a supply is required only for the data transmission device either from the Ethernet port 3 or from the two-wire line 4, without any need to pass this power on, no supply voltage need be output at any external connections, because of the respectively provided voltage detection means.

The described protection circuit also prevents mutual damage or damage to the data transmission device according to the present invention occurring as a result of the connection of devices which supply voltage both to the Ethernet port 3 and to the two-wire connection 4.

It should be mentioned that the connection 1a is supplied either all the time or else as required only after appropriate checking of the voltage/current conditions at the output.

The invention claimed is:
1. A data transmission device for transmission of data and power between an Ethernet connection connectable to a power load and a remote terminal via a two-wire cable which carries no mains current, the data transmission device comprising:
a two-wire connection connectable to the two-wire cable which carries no mains current for simultaneous transmission of data and power,
the Ethernet connection connectable to the power load for simultaneous transmission of data and power,
an Ethernet powerline converter connected to the Ethernet connection,
a power load detection device, connected to the Ethernet powerline converter, configured to detect, by voltage feed, whether the power load is connected to the Ethernet connection,
a power sourcing device, connected to the power load detection device and the Ethernet powerline converter, configured to, only when the power load detection device detects the power load is connected to the Ethernet connection, based on the determination that the power load is connected to the Ethernet connection, feed power to the power load via the Ethernet connection simultaneously with the transmission of the data, and
a voltage detection device, connected to the Ethernet connection, that prevents received power, which is received via the Ethernet connection from being fed back to and detected by the power load detection device, wherein
the data transmission device is configured to either:
be supplied with power from the two-wire connection and supply power into the Ethernet connection, or
be supplied with power from the Ethernet connection and supply power into the two-wire connection.

2. The data transmission device according to claim 1, wherein the power transmission device selectively transmits power from the two-wire connection to the Ethernet connection, or vice versa, as DC voltage power.

3. The data transmission device according to claim 1, wherein the two-wire connection which carries no mains current is connectable to a low-voltage two-wire line, for connection to a bell wire and/or a telephone wire line.

4. The data transmission device according to claim 1, wherein the data transmission device is configured to transmit data via the Ethernet connection at a higher data rate than via the two-wire connection, with a plurality of said Ethernet connections being provided.

5. The data transmission device according to claim 1, wherein more than one said Ethernet connection is provided, and data can be transmitted between the Ethernet connections at a data transmission rate which is higher than the data transmission rate via the two-wire connection which carries no mains current, with the data transmission device being provided with a switch, route and/or hub capability.

6. The data transmission device according to claim 1, wherein the data transmission device is configured to additionally and/or separately supply power to the power load, which is connected to the Ethernet connection, without data being transmitted.

7. The data transmission device according to claim 1, wherein the voltage detection device prevents the received power from being fed back in order to detect whether the power load is connected to the Ethernet connection by the power load detection device.

8. The data transmission device according to claim 1, wherein the voltage detection device prevents the received power from being fed back to the power load.

9. The data transmission device according to claim 1, further comprising a switch, connected to the Ethernet connection and the power load detection device, including a plurality of power-over-Ethernet ports.

10. The data transmission device according to claim 1, wherein
the Ethernet connection includes a plurality of lines for transmission of data, and the Ethernet powerline converter is configured for a data interchange between the plurality of lines.

11. The data transmission device according to claim 1, further comprising a transformer connected to the Ethernet connection and the Ethernet powerline converter.

12. The data transmission device according to claim 1, further comprising circuitry, connected to the two-wire connection and the power load detection device, configured to ensure, prior to feeding power to the two-wire connection, that power cannot already be received from the two-wire connection, or that no voltage is already present at the two wire connection.

13. A data transmission device for transmission of data and power between an Ethernet connection connectable to a power load and a remote terminal via a two-wire cable which carries no mains current, the data transmission device comprising:
a two-wire connection connectable to the two-wire cable which carries no mains current for simultaneous transmission of data and power,
the Ethernet connection connectable to the power load for simultaneous transmission data and power,
Ethernet powerline converter circuitry connected to the Ethernet connection,
power load detection circuitry, connected to the Ethernet powerline converter, configured to detect, by voltage feed, whether the power load is connected to the Ethernet connection,
power sourcing circuitry, connected to the power load detection circuitry and the Ethernet powerline converter circuitry, configured to, only when the power load detection circuitry detects the power load is connected to the Ethernet connection, based on the determination that the power load is connected to the Ethernet connection, feed power to the power load via the Ethernet connection simultaneously with the transmission of the data, and
voltage detection circuitry, connected to the Ethernet connection, that prevents received power, which is received via the Ethernet connection from being fed back to and detected by the power load detection device, wherein
the data transmission device is configured to either:
be supplied with power from the two-wire connection and supply power into the Ethernet connection, or
be supplied with power from the Ethernet connection and supply power into the two-wire connection.

* * * * *